United States Patent [19] [11] 3,880,673
Buhrer [45] Apr. 29, 1975

[54] ADAPTER FOR HIGH VOLTAGE ELECTROCHEMICAL CELL

[75] Inventor: Carl F. Buhrer, Framingham, Mass.

[73] Assignee: GTE Laboratories Incorporated, Waltham, Mass.

[22] Filed: Mar. 12, 1973

[21] Appl. No.: 340,421

[52] U.S. Cl. .................................... 136/173
[51] Int. Cl. .............................................. H01m 1/00
[58] Field of Search ........... 136/173, 108, 134, 110, 136/166, 175

[56] References Cited
UNITED STATES PATENTS

| | | | |
|---|---|---|---|
| 1,075,556 | 10/1913 | Fenoughty | 136/173.1 |
| 1,432,348 | 10/1922 | Lyhne | 136/173.1 |
| 1,487,428 | 3/1924 | Balderston | 136/173.1 |
| 2,449,568 | 9/1948 | Shriro et al. | 136/173.1 |
| 2,980,753 | 4/1961 | Noller | 136/173 |

Primary Examiner—John H. Mack
Assistant Examiner—H. A. Feeley
Attorney, Agent, or Firm—Irving M. Kriegsman; Leslie J. Hart

[57] ABSTRACT

An adapter is described with which cells of conventional size but of voltage approximately double that of conventional cells may be directly substituted in devices such as flashlights and the like. The adapter is formed of at least a pair of conductive elements which are shaped and sized to interconnect like cell electrodes for parallel connection of the cells. Several adapter embodiments are described with one for parallel connection of end to end located cells in a flashlight and the other adapter embodiment to parallel connect cells arranged in side by side relationship.

2 Claims, 4 Drawing Figures

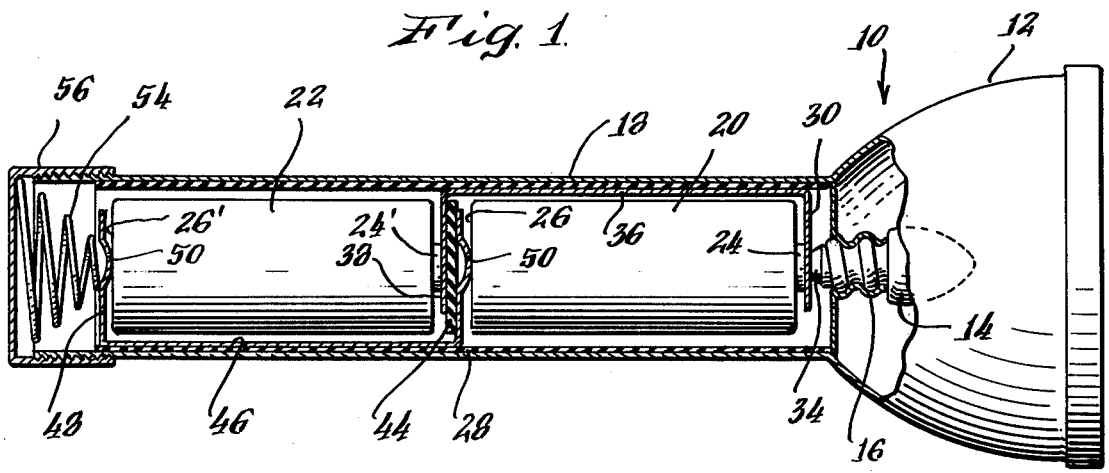
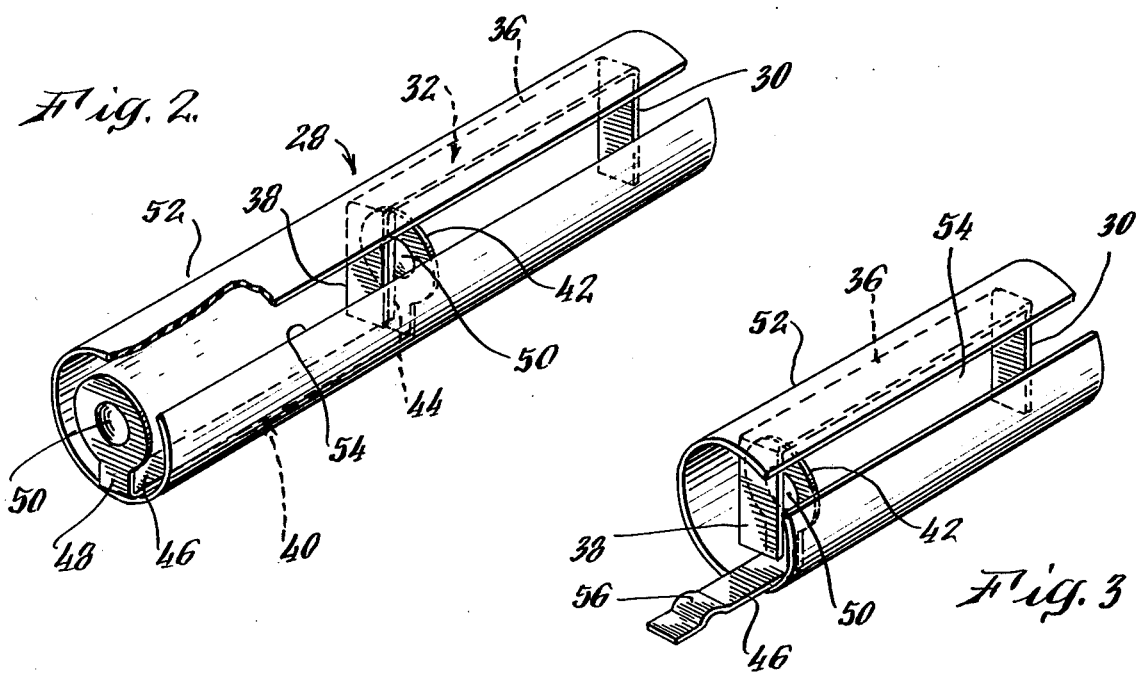
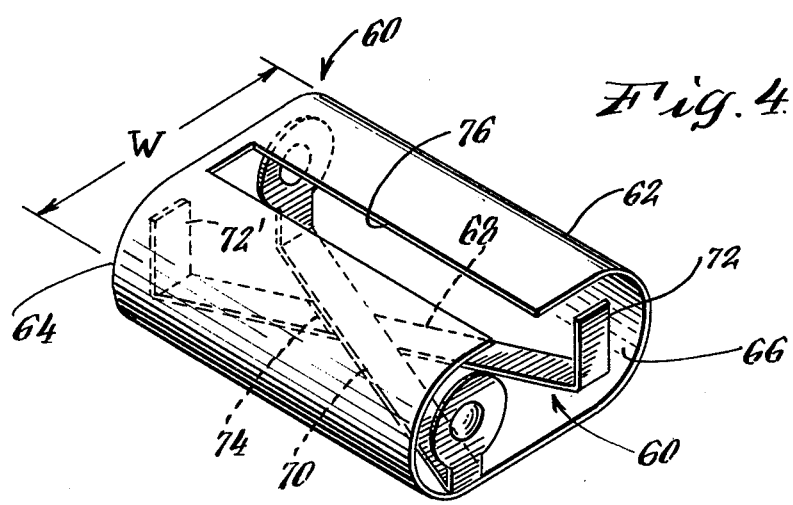

ADAPTER FOR HIGH VOLTAGE ELECTROCHEMICAL CELL

FIELD OF THE INVENTION

The invention relates to an adapter with which high voltage electrochemical cells may be employed in devices presently using similarly sized low voltage electrochemical cells.

BACKGROUND OF THE INVENTION

Cylindrical electrochemical dry cells for use in devices such as flashlights and the like are well-known. The cell body has a positive electrode at one axial end and a negative electrode at the other axial end. Commonly, these cells fit end to end in a flashlight to connect in series to form a sufficiently high voltage of the order of 3 volts. In other devices, cells may be mounted in side to side relationship with their polarity electrodes in opposite directions and with conductor straps located to connect the cells in series.

New types of electrochemical cells are being developed which have an unusually large output voltage of the order of three volts, which is about twice that of the common one and a half volt dry Leclanché cell. These new cells are based upon a highly electropositive metal such as lithium and are particularly attractive because of a high energy density and relatively low weight.

When such new high voltage cell is formed of the same physical size as the common cylindrical dry cell, a direct substitution is not possible by virtue of the higher voltage.

SUMMARY OF THE INVENTION

With an adapter in accordance with the invention, a practical and inexpensive device is obtained whereby high voltage battery cells having the same physical shape as conventional battery cells may be used in direct substitution in flashlights and the like.

For example, with an adapter in accordance with the invention a pair of cylindrical high voltage cells are connected in parallel. The adapter is formed of a pair of conductive strips or elements. One strip connects from one electrode to the similar electrode on the other cell and the other strip interconnects the opposite polarity electrodes of the two cells. In order to avoid an electrical shorting, an insulative sleeve is employed which in the end to end physical configuration fits at least around the leading cell to avoid electrical shorting to the metal body of the flashlight or other device in which the cells are housed.

In another embodiment for an adapter in accordance with the invention, a pair of high voltage battery cells may be used in side to side relationship in a manner similar as in conventional devices. The adapter in this case employs a plastic sleeve wherein the cells are again connected in parallel relationship but are physically placed alongside each other.

It is, therefore, an object of the invention to provide an adapter by which high voltage cells may be used in conventional devices such as flashlights and the like.

BRIEF DESCRIPTION OF DRAWINGS

These and other advantages and objects of the invention may be understood from the following detailed description of several embodiments for an adapter in accordance with the invention described in conjunction with the drawings wherein FIG. 1 is a section view of an adapter in accordance with the invention as used in a flashlight;

FIG. 2 is a perspective partially broken-away view of the adapter employed in the embodiment shown in FIG. 1;

FIG. 3 is a modified form of the adapter shown in FIG. 2;

FIG. 4 is another embodiment for an adapter in accordance with the invention.

DETAILED DESCRIPTION OF EMBODIMENTS

With reference to FIGS. 1 and 2, a flashlight 10 of conventional design is illustrated with a front beam reflector 12, a light bulb 14 mounted in a socket 16 for electrical connection to a metal flashlight housing 18 and cells 20, 22. Cells 20, 22 are of the high voltage type with about 3 volts potential. The cells are of conventional cylindrical design with positive axially protruding electrodes 24-24' and rear negative electrodes 26-26'. The cells are shown in end to end relationship but are connected in parallel with an adapter 28.

Flashlight bulb 14 is shown in contact with the front end or tab 30 of a first conductive element 32 of adapter 28. Front end 30 is located between contact 34 of bulb 14 and the front positive electrode 24 of leading cell 20. An intermediate segment 36 of first element 32 extends alongside the peripheral surface of cell 20 towards positive electrode 24' to which element 32 is coupled with a rear tab segment 38.

A second conductive element 40 of adapter 28 interconnects negative electrodes 26-26'. A front end segment 42 of element 40 extends radially inwardly between segment 38 and electrode 26 with an insulator 44 located between segments 38 and 42. Second conductive element 40 has an intermediate segment 46 located along the peripheral surface of the trailing cell 22 to terminate with a rear segment 48 arranged for contact with electrode 26'. Both segments 42 and 48 are provided with dimples 50 to assure electrical contact with the flat surface electrodes 26-26'.

An insulator sleeve 52 is mounted around adapter 28 to prevent electrical shorting of first conductor element 32 to the metallic housing 18. In the event housing 18 is formed of a non-conductive material such as plastic, the insulator sleeve 52 may be dispensed with. Sleeve 52 has a longitudinal slot 54 and is formed of a thin springy flexible material to enable one to pull slot 54 open to insert cells 20-22.

Adapter 28 connects cells 20-22 so that the bulb 14 may be driven with the same voltage but with extended lifetime of the cells. A spring 54 is mounted to a cap 56 to provide electrical contact between electrodes 26-26' and housing 18. In an alternate approach as shown in FIG. 3, segment 46 may be shaped with a segment 56 to provide direct contact, under pressure by cell 22, with conductive housing 18. In such case, sleeve 52 need only be sufficiently long to cover first conductive element 32 and segment 38. Insulator 44 preferably is attached to segments 38 and 42 by a suitable adhesive to form an integrally connected adapter 28.

In an alternate embodiment as shown in FIG. 4, cells such as 20-22 can be employed in side to side relationship with their electrodes facing opposite directions. An adapter 60 is used to place the cells in electrical parallel relationship. Adapter 60 is formed of a thin insulator sleeve 62 having a width W sufficient to enable a pair of cells to fit in side to side relationship. One axial end 64 of insulator sleeve 62 is closed and the other end 66 is open. Within adapter 60 are a pair of crossing electrical conductive elements 68, 70 which provide electrical contact between respectively like electrodes of the cells.

One strip element 68 is shown with end segments 72–72' for contact with positive electrodes such as 24–24' shown in FIG. 1. The other strip 70 is provided with segments such as 42 to contact negative electrodes such as 26–26'. An insulator material 74 is located between the crossing point between elements 68, 70 to avoid their direct electrical contact. A suitably sized slot 76 is provided to enable one to insert cells within adapter 60.

Having thus described an adapter for use in connection with a high voltage battery cell, its advantages may be appreciated.

What is claimed is:

1. An adapter for parallel electrical connection of high electrical voltage cells having positive and negative electrodes at opposite front and rear located ends and being oriented in parallel adjacent relationship with electrodes of opposite polarity at each end of the combinded parallel arranged cells, comprising: a thin flexible insulating sleeve for housing the cells, the sleeve further including first and second axial ends adapted to be aligned with the ends of the combined parallel arranged cells, the first end being closed and the second end being formed witn an opening, and being formed with a slot substantially extending axially along a first side of the sleeve, the slot adapted to form an opening through which the cells are inserted into the sleeve; and first and second electrically separated conductive elements located within the sleeve, the elements each including a segment on each end of the elements for making contact with an electrode of a cell, the elements extending in opposite diagonal directions within the sleeve from the first to the second ends of the sleeve such that the first element connects the positive electrodes of the cells and the second element connects the negative electrodes of the cells, the elements being generally adjacent the inner surface of a side of the sleeve opposite to the first side.

2. The adapter as claimed in claim 1 wherein the first and second conductive elements cross each other and an insulator strip is located between the elements at their crossing for electrical separation thereof.

* * * * *